United States Patent
Ruble et al.

(10) Patent No.: US 8,774,003 B1
(45) Date of Patent: Jul. 8, 2014

(54) SYSTEMS AND METHODS FOR PROVIDING SERVICE ADMISSION CONTROL IN TELECOMMUNICATION NETWORKS

(75) Inventors: Andrew T. Ruble, Elkmont, AL (US); Jamie S. Kelly, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 411 days.

(21) Appl. No.: 12/768,956

(22) Filed: Apr. 28, 2010

(51) Int. Cl.
  *H04L 12/26* (2006.01)
(52) U.S. Cl.
  USPC ........... 370/236; 370/252; 370/254; 370/351; 370/400
(58) Field of Classification Search
  USPC ......... 370/229, 230, 232, 235, 236, 237, 252, 370/254–256, 282, 351, 389, 395.2, 395.21, 370/400, 428, 429
  See application file for complete search history.

(56) References Cited

U.S. PATENT DOCUMENTS

| | | | |
|---|---|---|---|
| 6,377,546 B1 | 4/2002 | Guerin et al. | |
| 7,065,573 B2 | 6/2006 | Byrnes | |
| 7,075,892 B2 * | 7/2006 | Grover et al. | 370/238 |
| 7,283,741 B2 * | 10/2007 | Sadananda | 398/5 |
| 7,477,599 B2 | 1/2009 | Lee et al. | |
| 7,889,743 B2 * | 2/2011 | Evans et al. | 370/394 |
| 2003/0009553 A1 | 1/2003 | Benfield et al. | |
| 2003/0133406 A1 | 7/2003 | Fawaz et al. | |
| 2006/0067213 A1 | 3/2006 | Evans et al. | |
| 2008/0037552 A1 | 2/2008 | Dos Remedios et al. | |
| 2008/0181248 A1 | 7/2008 | Haran et al. | |
| 2008/0219279 A1 | 9/2008 | Chew | |
| 2008/0253325 A1 | 10/2008 | Park et al. | |
| 2008/0298240 A1 * | 12/2008 | Lee et al. | 370/235 |

\* cited by examiner

*Primary Examiner* — Edan Orgad
*Assistant Examiner* — Curtis A Alia
(74) *Attorney, Agent, or Firm* — Maynard Cooper & Gale, P.C.; Jon E. Holland

(57) ABSTRACT

The present disclosure generally pertains to systems and methods for providing service admission control in telecommunication networks. In one exemplary embodiment, a system comprises a network access control (SAC) element that is coupled to at least one node of a network segment. The SAC element communicates with each network node within the network segment to discover its configuration and capacity. The SAC element also stores information indicative of performance requirements, such as terms of SLAs pertaining to traffic that passes through the network segment. When a new service is to be added, the SAC element receives information indicative of the new service and its requirements, such as the SLA terms for the new service. The SAC element then automatically determines whether the network segment has sufficient capacity to add the new service without violating the SLAs of any of the services using the network segment. The SAC element then provides an output indicating whether the new service can be so added. Accordingly, the SAC element can be used to ensure SLA compliance.

17 Claims, 5 Drawing Sheets

SYSTEMS AND METHODS FOR PROVIDING SERVICE ADMISSION CONTROL IN TELECOMMUNICATION NETWORKS

RELATED ART

A network service provider often provides a customer with a service level agreement (SLA) in which the service provider guarantees that its network will achieve a specified level of performance for the customer. Such an SLA may specify various performance parameters, such as average data rate, maximum delay, minimum packet delivery ratio, and/or other parameters, that the provider's network segment is required to achieve. If the customer agrees to the SLA, then the network service provider uses industry-accepted practices to provision and maintain its network segment in an effort to meet the requirements of the SLA.

In this regard, a technician typically analyzes various high-level aspects of the network configuration in an effort to determine whether the network has sufficient capacity for the services being added by the new SLA. If the technician believes that there is insufficient or marginal capacity, the technician may modify the configuration of the network, such as adding more network nodes or adjusting the configurations of various nodes. Further, the technician may prioritize the traffic flows within the network such that, when congestion occurs, the congestion is handled in a manner that increases the probability of SLA compliance, particularly for the service provider's most valued customers.

Unfortunately, the process of provisioning networks and ensuring SLA compliance is difficult and problematic, even for a skilled technician. Further, there are numerous network parameters that affect the flow of data through a network, and the complexity of the network analysis increase exponentially as the network grows. Indeed, it is cost prohibitive and, even if possible, extremely difficult for a technician to precisely calculate all possible flows through a network under all possible conditions so that he or she can truly ensure SLA compliance.

Further, there is a popular belief that prioritization ensures SLA compliance. Prioritization controls how congestion is handled and may help to reduce SLA violations, but prioritization does not address the underlying capacity-related problems that create the congestion. Moreover, if a network has not been properly provisioned to provide sufficient capacity to meet SLA minimums, then prioritization can manage congestion and potentially control which SLAs are violated, but prioritization cannot prevent at least some SLA violations when congestion occurs. Thus, while network service providers use their best efforts to manage SLA compliance, most network service providers do not attempt to ensure that all SLAs will be satisfied under all possible network conditions.

Accordingly, there are times when a provider's network is unable to perform at the level specified by an SLA and, therefore, violates the terms of the SLA. The network service provider often discovers such violation after a customer experiences performance problems and complains about the quality of the service. If the service provider determines that the customer's problem is related to the limited capacity of its network, as opposed to a failure that is causing an abnormal condition, then the service provider may add network capacity in an effort to alleviate the problem. In some cases, however, the problem could have been remedied by reconfiguring the network in a more efficient manner rather than adding network capacity, but because the task of analyzing the network to discover this information may be so daunting or complex, the technician may not realize a better solution to the customer's problem.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for providing service admission control in telecommunication networks. In one exemplary embodiment, a system comprises a service access control (SAC) element that is coupled to at least one node of a network segment. The SAC element communicates with each network node within the network segment to discover its configuration and capacity. The SAC element also stores information indicative of performance requirements, such as terms of SLAs pertaining to traffic that passes through the network segment. When a new service is to be added, the SAC element receives information indicative of the new service and its requirements, such as the SLA terms for the new service. The SAC element then automatically determines whether the network segment has sufficient capacity to add the new service without violating the SLAs of any of the services using the network segment. The SAC element then provides an output indicating whether the new service can be so added. Accordingly, the SAC element can be used to ensure SLA compliance.

In addition, in analyzing the capacity of the network segment, the SAC element may provide information pinpointing the network location or locations where network capacity or configuration is insufficient and/or where problems are likely to arise when the service is added. Thus, even if the current configuration of the network segment does not have sufficient capacity to add a particular service while ensuring SLA compliance, the SAC element may provide information that can be used to determine how the configuration of the network segment can be changed in order to add the new service either without adding network equipment or reducing the amount of network equipment that would otherwise be added.

Figure 1:
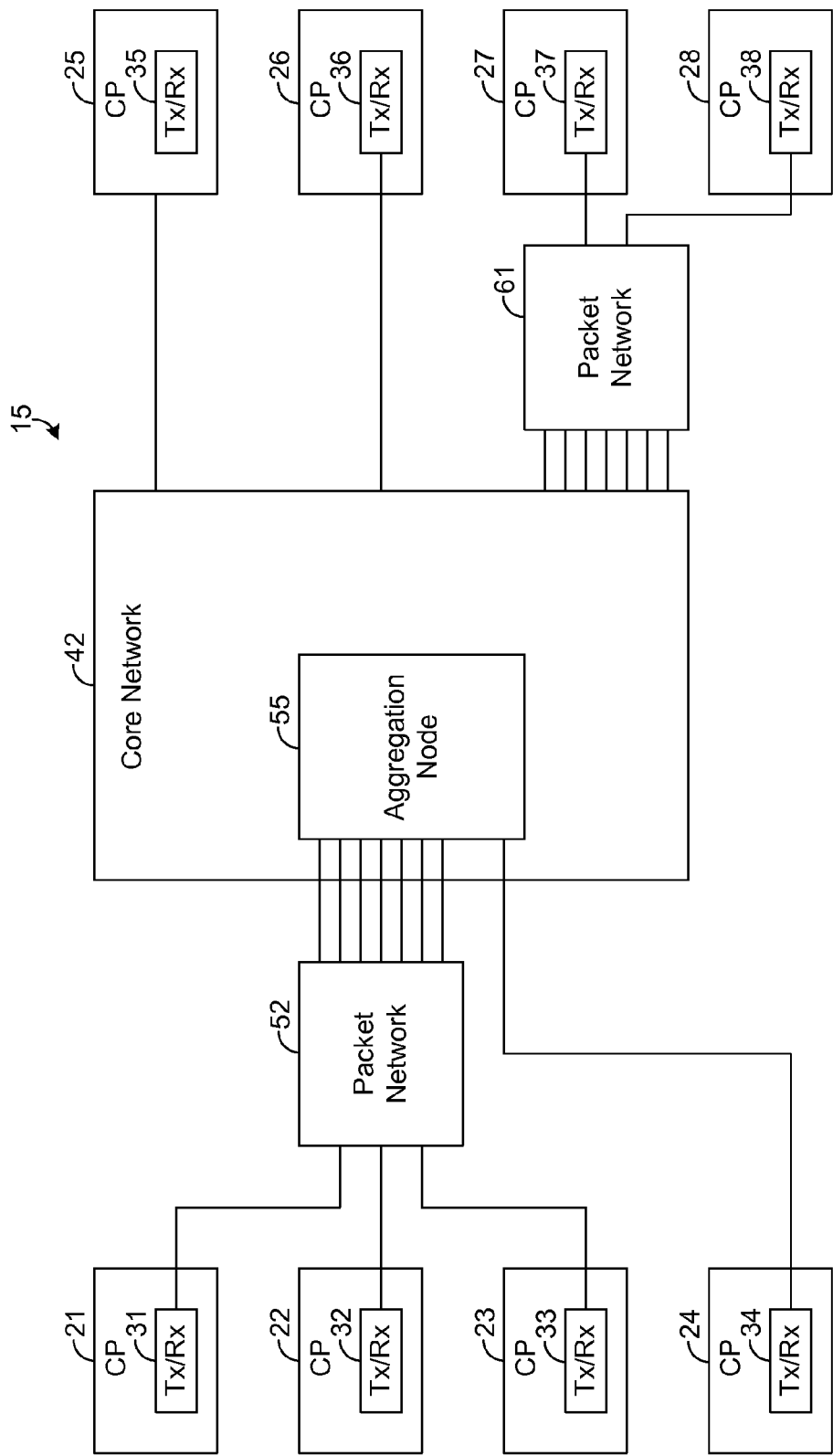
FIG. 1 is a block diagram illustrating an exemplary embodiment of a telecommunication system in accordance with the present disclosure.

FIG. 1 depicts an exemplary embodiment of a telecommunication system 15 servicing communication equipment at a plurality of customer premises 21-28. As shown by FIG. 1, each customer premises 21-28 has at least one customer premises (CP) transceiver 31-38 for communicating data to and from the respective customer premises. For illustrative purposes, FIG. 1 depicts eight customer premises 21-28, each having one CP transceiver 31-38, but other numbers of customer premises 21-28 and/or CP transceivers 31-38 are possible in other embodiments.

Data from any one customer premises 21-28 is received by a core network 42, which routes the data through the core network 42 such that it is received at another customer premises. As an example, data from the CP transceiver 31 may be received by the core network 42 and routed through the network 42 such that is received by any one of CP transceivers 32-38 at the other customer premises 22-28.

The distance from a customer premises 21-28 to the core network 42 is on the order of up to about three miles, although other distances are possible depending on the protocols, repeaters, and crosstalk limitations that may be applicable. The core network 42 may extend across vast distances, such as hundreds or thousands of miles.

In the exemplary embodiment shown by FIG. 1, three CP transceivers 31-33 are coupled to a packet network 52, although other numbers of CP transceivers may be coupled to the packet network 52 in other embodiments. In one exemplary embodiment, the packet network 52 is implemented as an Ethernet network such that Ethernet protocols are used to transmit data packets through the network 52. In other embodiments, other types of protocols may be used.

Payload data from any of the CP transceivers 31-33 is packetized into a plurality of data packets for transmission through the network 52. The packetization may be performed by the CP transceivers 31-33. Alternatively, data received from any of the CP transceivers 31-33 may be packetized by one or more nodes (not specifically shown in FIG. 1) at an edge of the packet network 52. The data packets are transmitted through the packet network 52 and are depacketized in order to recover the payload data. The depacketization may be performed by an aggregation node 55 of the core network 42 or may be performed by one or more nodes (not specifically shown in FIG. 1) at an edge of the packet network 52. For illustrative purposes, it will be assumed hereafter that payload data transmitted from the CP transceivers 31-33 is packetized into data packets by such CP transceivers 31-33 and these data packets are depacketized by the aggregation node 55.

Payload data from the CP transceivers 31-33 coupled to the packet network 52 and possibly payload data from other CP transceivers, such as CP transceiver 34, are aggregated into at least one high speed data stream at the aggregation node 55. The payload data from each CP transceiver 31-34 is routed from the aggregation node 55 through the core network 42 to the appropriate destinations.

Payload data that is routed through the core network 42 to any of the CP transceivers 31-33 coupled to the packet network 52 and possibly other CP transceivers, such as CP transceiver 34, is received at the aggregation node 55. Payload data destined for any of the CP transceivers 31-33 is transmitted from the aggregation node 55 to the packet network 52. Such data is packetized into a plurality of data packets for transmission through the packet network 52. The packetization may be performed by the aggregation node 55 or one or more nodes (not specifically shown in FIG. 1) at an edge of the packet network 52.

The data packets carrying the payload data from the aggregation node 55 are depacketized to recover such payload data. Such depacketization may be performed by the CP transceivers 31-33. Alternatively, the data packets destined for any of the CP transceivers 31-33 may be depacketized by one or more nodes (not specifically shown in FIG. 1) at an edge of the packet network 52. For illustrative purposes, it will be assumed hereafter that payload data transmitted from the aggregation node 55 is packetized into data packets by such node 55 and these data packets are depacketized by the CP transceivers 31-33. Thus, edge nodes (not specifically shown in FIG. 1) of the network 52 receive data packets compatible for transmission through the network 52.

As shown by FIG. 1, other CP transceivers, such as CP transceivers 37 and 38, are similarly coupled to a packet network 61 through which data may be transmitted to and from the core network 42. The operation and configuration of the packet network 61 may be similar to the operation and configuration of the packet network 52, if desired.

Figure 2:
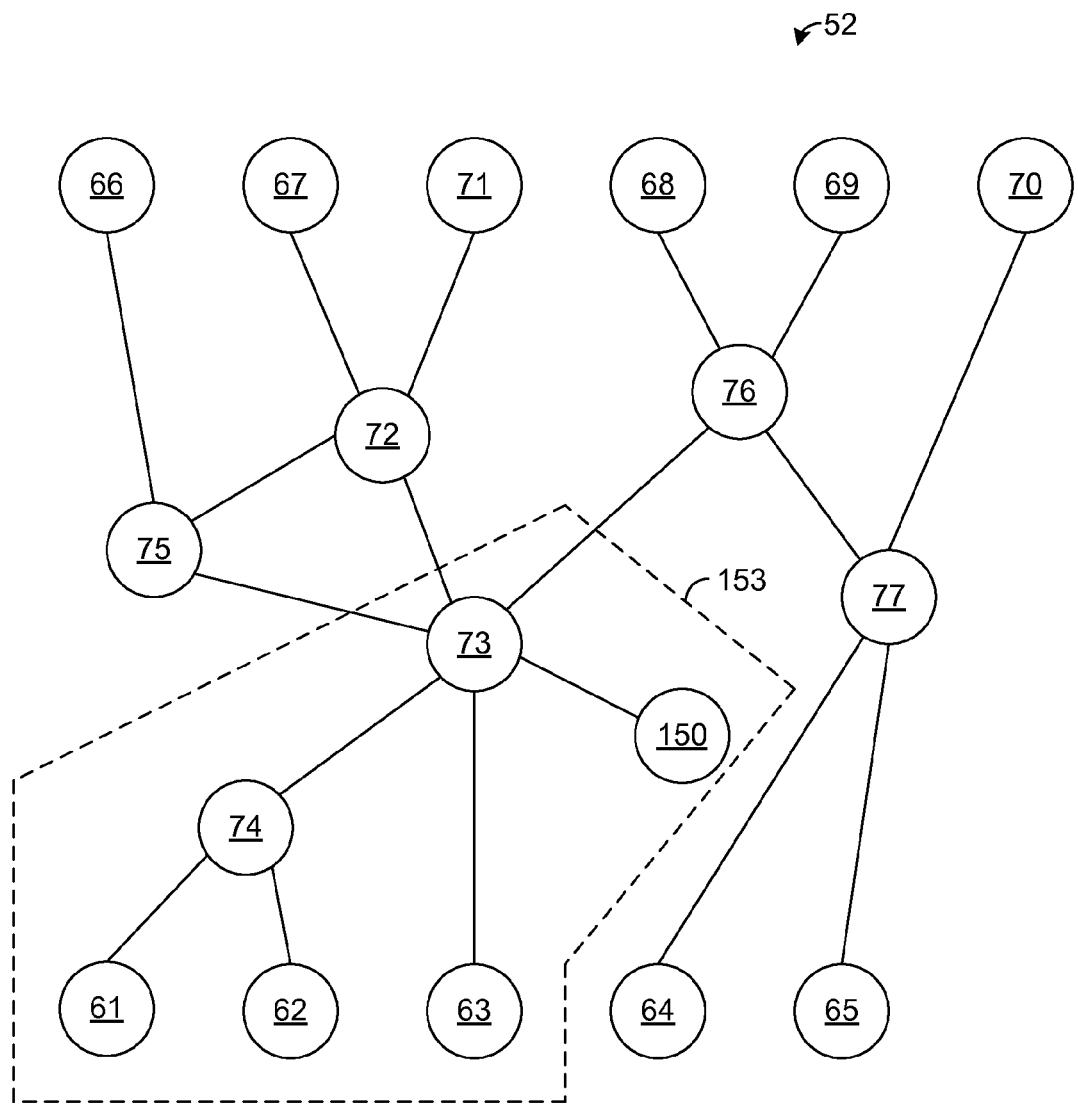
FIG. 2 is a block diagram illustrating an exemplary embodiment of a packet network, such as is depicted in FIG. 1.

FIG. 2 depicts an exemplary embodiment of the packet network 52. The packet network 52 comprises a plurality of nodes 61-71, referred to as "edge nodes," at the edges of the network 52. An "edge node" generally refers to a node that is coupled between another node of the network 52 and another node or device, such as a CP transceiver 31-33 or aggregation node 55, that is not a member of the network 52. Thus, an edge node generally resides on the edge or perimeter of the network 52 and interfaces the network 52 with other devices or nodes. For illustrative purposes, data will be assumed to flow in FIG. 2 from the bottom of the page or from edge nodes 61-65 to the top of the page or to edge nodes 66-71. Accordingly, the edge nodes 61-65 will be referred to hereafter as "ingress nodes," and the edge nodes 66-71 will be referred to hereafter as "egress nodes." An "egress node" generally refers to an edge node through which data flows out of the network 52, and an "ingress node" generally refers to an edge node through which data flows into the network 52. Note that data may flow in the opposite direction such that the same edge node may serve as an ingress node for one data flow and an egress node for another data flow that is in the opposite direction.

As shown by FIG. 2, the network 52 also comprises a plurality of nodes 72-77, referred to hereafter as "intermediate nodes." The intermediate nodes 72-77 provide network data paths from ingress nodes 61-65 to egress nodes 66-71. The exemplary network 52 shown by FIG. 2 has eleven edge nodes 61-71 and six intermediate nodes 72-77. In other embodiments, the network 52 may have any number of edge nodes 61-71 and may have any number of intermediate nodes 72-77.

Figure 3:
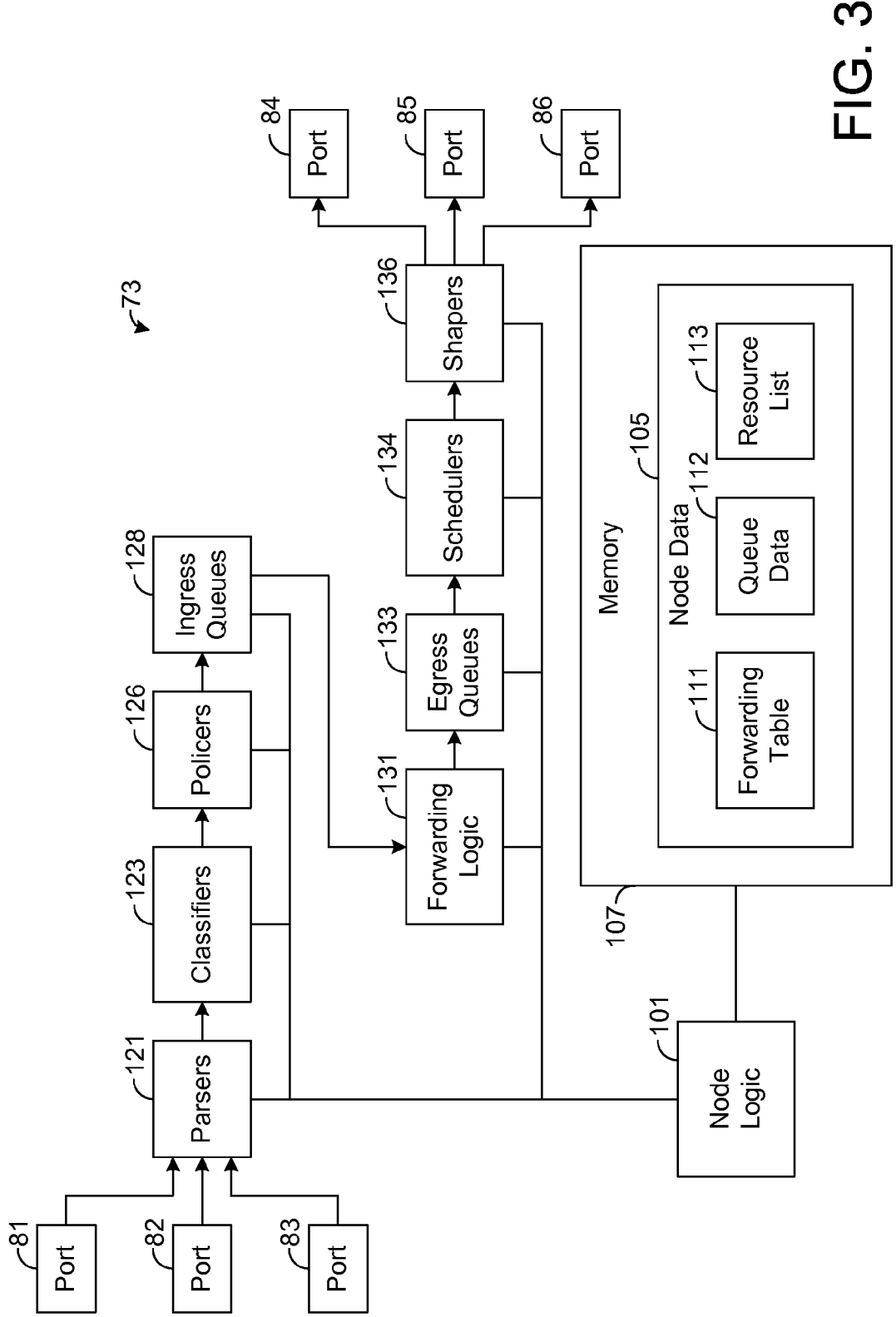
FIG. 3 is a block diagram illustrating an exemplary embodiment of a network node, such as is depicted in FIG. 2.

FIG. 3 depicts an exemplary embodiment of a network node 73. The other network nodes 61-72 and 74-77 may be configured similar or identical to the exemplary node 73 shown by FIG. 3. As shown by FIG. 3, the node 73 comprises a plurality of ports 81-86. Data packets are received from other nodes via the ports 81-83, which are referred to herein as "ingress ports," and data packets are transmitted to other nodes via the ports 84-86, which are referred to herein as "egress ports." For illustrative purposes, FIG. 3 shows three ingress ports 81-83 and three egress ports 84-86, but any number of ingress ports and egress ports may be used in other embodiments.

As shown by FIG. 3, the exemplary node 73 comprises node logic 101 for generally controlling and managing the operation of the node 73. The node logic 101 can be implemented in software, hardware, firmware, or any combination thereof. In one exemplary embodiment, the node logic 101 is implemented in software and executed by a processing element (not specifically shown), such as a digital signal processor or central processing element, but other configurations the node logic 101 are possible in other embodiments.

Node data 105 is locally stored in memory 107 and is indicative of the node's configuration and capacity. As an example, in one exemplary embodiment, the node data 105 comprises a forwarding table 111, queue data 112, and a resource list 113. The forwarding table 111 indicates how packets received by the node 73 are to be forwarded within the node 73. For example, the forwarding table 111 may indicate which egress queue is to receive data packets from a particular data flow thereby controlling which egress port 84-86 transmits such data packets. The queue data 112 identifies each queue within the node 73 and, for each queue, indicates its respective depth. Thus, the queue data 112 can be used to determine how much data can be queued by a particular node queue before a data overrun occurs. The resource list 113 identifies other resources of the node 73, such as rate limiters, schedulers, policers, ports, etc. For each resource, the resource list 113 indicates the limits, if any, on the resource's capability or capacity. As an example, the resource list may indicate a maximum link rate for an identified port.

As shown by FIG. 3, data generally flows through parsers 121, classifiers 123, policers 126, ingress queues 128, forwarding logic 131, egress queues 133, schedulers 134, and shapers 136. For each received data packet, a parser 121 recovers from the packet or otherwise determines metadata that is indicative of various attributes associated with the packet. As an example, the metadata may include address identifiers within the packet, such as the packet's destination or source address, and the metadata may include parameters not contained with the packet, such as the identifier of the node's ingress port 81-83 that received the packet. Various other types of information may be indicated by the metadata as known in the art.

For each data packet, a classifier 123 classifies the packet. As an example, the classifier 123 may indicate the service type associated with the flow, and prioritization within the node 73 may be based on such classification. For example, a policer 126 may be configured to drop data packets based on an average data rate and a maximum burst size in order to handle congestion and, in particular, prevent data overruns in the ingress queues 128. In addition, in one exemplary embodiment, each data flow serviced by the node 73 has an identifier, referred to as a "flow identifier." Such identifier may be used to process the packets from the data flow, as will be described in more detail hereafter. The flow identifier is assigned to and correlated with a packet by the classifier 123 based on the packet's metadata, such as an address with the packet and/or a port identifier identifying the ingress port 81-83 that received the packet.

The forwarding logic 131 pulls packets from the ingress queues 128 and forwards each such packet to a respective egress queue 133 based on the forwarding table 111. In this regard, as described above, the forwarding table 111 maps packets to egress queues 133 so that the packets are forwarded to the appropriate egress queues 133. In one exemplary embodiment, the mappings are based on the flow identifiers. As an example, the forwarding table 111 may map a flow identifier to a particular egress queue 133 such that each packet correlated with such flow identifier is forwarded by the forwarding logic 131 to such egress queue 133 and, therefore, is transmitted across the same link to the same node of the network 52. In one exemplary embodiment, each egress queue 133 is coupled to a single egress port 84-86 such that each packet stored in the same egress queue 133 is transmitted via the same egress port 84-86, but other configurations of the node 73 are possible in other embodiments.

The schedulers 134 determine the order in which data is pulled from the egress queues 133, and the shapers 136 determine the timing of when data is pulled from the egress queues 133, as known in the art.

As shown by FIG. 2, a service admission control (SAC) element 150 is coupled to at least one node of the network 52.

In the exemplary embodiment shown by FIG. 2, the SAC element 150 is coupled to the node 73, but the SAC element 150 may be coupled to other nodes of the network 52 is other embodiments.

As will be described in more detail hereafter, the SAC element 150 is configured to monitor at least a segment 153 of the network 52 in order to determine whether such segment 153 can support a new data service while still achieving specified performance parameters, such as performance specified in SLAs. Thus, the SAC element 150 can be used to ensure that the network segment 153 has sufficient capacity to meet the specified performance parameters.

Figure 4:
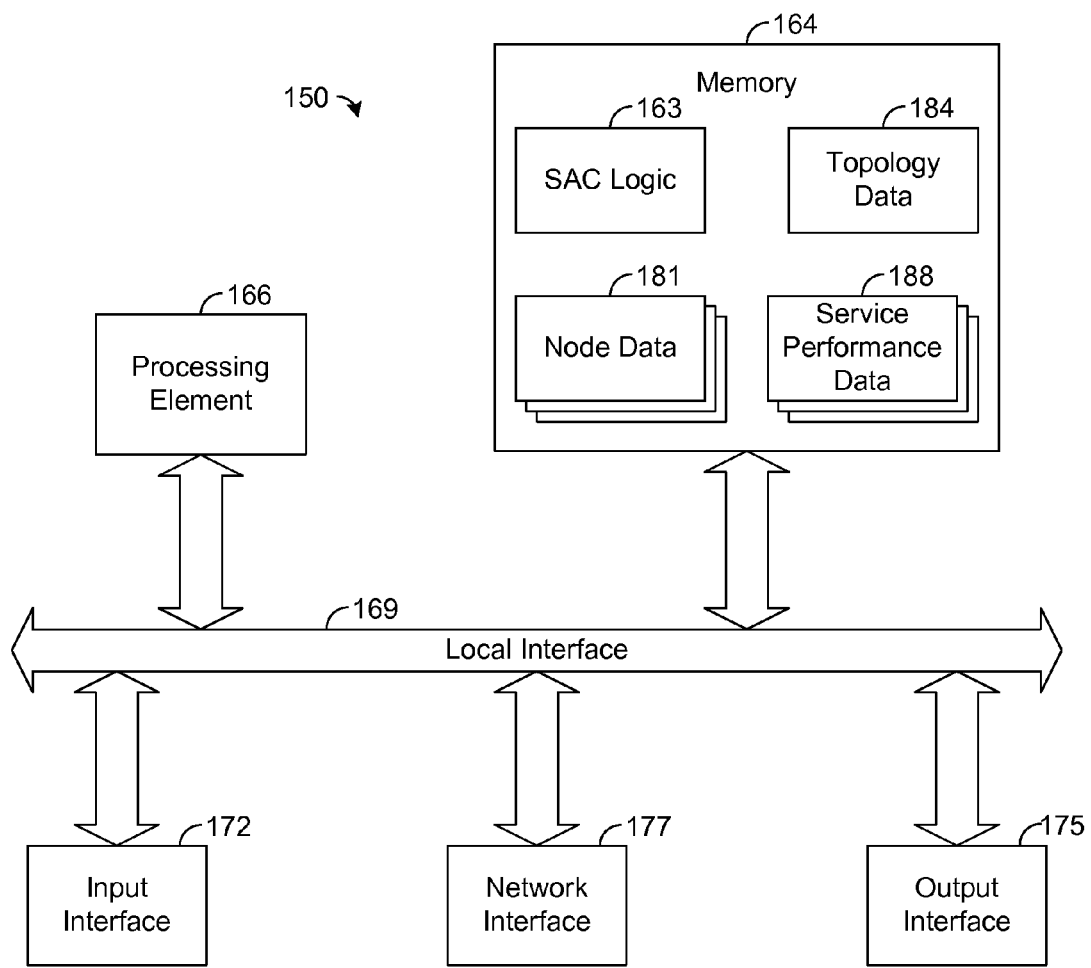
FIG. 4 is a block diagram illustrating an exemplary embodiment of a service admission control (SAC) element, such as is depicted in FIG. 2.

FIG. 4 depicts an exemplary embodiment of the SAC element 150. As shown by FIG. 4, the SAC element comprises SAC logic 163 for generally controlling the operation of the SAC element 150, as will be described in more detail hereafter. The SAC logic 163 can be implemented in software, hardware, firmware, or any combination thereof. In the exemplary embodiment illustrated in FIG. 4, the SAC logic 163 is implemented in software and stored in memory 164 of the SAC element 150.

Note that the SAC logic 163, when implemented in software, can be stored and transported on any computer-readable medium for use by or in connection with an instruction execution apparatus that can fetch and execute instructions. In the context of this document, a "computer-readable medium" can be any means that can contain or store a program for use by or in connection with an instruction execution apparatus.

The exemplary embodiment of the SAC element 150 depicted by FIG. 4 comprises at least one conventional processing element 166, such as a digital signal processor (DSP) or a central processing unit (CPU), that communicates to and drives the other elements within the element 150 via a local interface 169, which can include at least one bus. Furthermore, an input interface 172, for example, a keyboard or a mouse, can be used to input data from a user of the element 150, and an output interface 175, for example, a printer, monitor or liquid crystal display (LCD), can be used to output data to the user. Further, the SAC element 150 has a network interface 177 for enabling the SAC element 150 to communicate with at least one node 73 of the network 52.

The SAC element 150 stores sets (e.g., entries or files) of node data 181. Each set of a node data 181 is correlated with a respective node within the network segment 153 monitored by the SAC element 150 and is indicative of the capacity and/or configuration of such correlated node. In one exemplary embodiment, each node 61-77 has a unique identifier identifying it from the other nodes of the network 52, and the set of node data 181 correlated with a given node 61-77 includes the node's identifier. Thus, the node's identifier can be used as a key to lookup and find the set of node data 181 that is correlated with the node 61-77.

Various types of information may be indicated by the node data 181. In one embodiment, the node data 181 indicates at least some of the same information stored at the correlated node as local node data 105 (FIG. 3). As an example, the set of node data 181 correlated with a given node includes the forwarding table 111, the queue data 112, and the resource list 113 of the correlated node. Such information may be input via the input interface 172 or otherwise received by the SAC element 150, such as retrieved from the correlated node. The node data 181 may include other types of configuration and capacity information in other embodiments.

The SAC element 150 also stores topology data 184 indicative of the topology of the network segment 153. In this regard, the topology data 184 includes the node identifier of each node within the segment 153 and indicates the connectivity between the nodes. The topology data 184 may be input to the SAC element 150 via the input interface 172. Alternatively, the SAC logic 163 may be configured to discover the topology by communicating with the nodes of the network segment 153 via control packets or otherwise. Techniques for discovering a topology of a network are generally well-known and will not be discussed in detail herein.

The SAC element 150 further stores sets (e.g., entries or files) of service performance data 188. Each set of service performance data 188 is correlated with and indicative of specified performance parameters for a respective data service supported by the network segment 153. For example, a set of service performance data 188 may include the performance requirements for a respective SLA. As a mere example, the set of service performance data 188 may specify performance parameters, such as average data rate, maximum delay, minimum packet delivery ratio, maximum allowable burst size, and/or other parameters, for a given data flow supported by the network segment 153. Various other types of performance parameters may be indicated by the data 188 in other embodiments.

The SAC logic 163 is configured to analyze the node data 181, the topology data 184, and the service performance data 188 to automatically determine whether the capacity and configuration of the network segment 153, as indicated by the node data 181 and topology data 184, are sufficient to support the services indicated by the service performance data 188 without violating the service performance parameters indicated by the data 188.

In this regard, the SAC logic 163 assumes a scenario in which each possible data flow supported by the network segment 153 is actively transmitting data at certain performance parameter limits, such as average data rate, maximum delay, and minimum packet delivery ratio, indicated for the data flow by the service performance data 188. The SAC logic 163 analyzes the node configurations and capacities, as indicated by the node data 181 to determine whether the network segment 153 is able to handle the data flows without unacceptable data overruns, delays, loss of data, etc.

In one exemplary embodiment, the SAC logic 163, for each node of the network segment 153, calculates the rate that data is respectively received by the node's queues assuming that all data flows are active and operating at certain performance parameter limits specified by the flow performance data 188. The SAC logic 163 then determines whether the node has sufficient capacity, such as sufficient queue depth, to accommodate the data flows passing through the node. For illustrative purposes, exemplary analyses of the node 73 will be described below, but it should be noted that other nodes may be analyzed via similar techniques to ensure that they are sufficiently configured to handle the data flows respectively supported by the nodes.

Note that the SAC logic 163 determines the rate that data is received by each ingress queue 128 based on the knowledge of the data flows, as indicated by the service performance data 188 (assuming that each data flow is satisfying its performance parameter limits), the topology data 184, and the configuration and capacity of the node, as indicated by the node data 181. In this regard, the path of a given data flow can be determined based on the node data 181 and the topology data 184. As an example, based on the topology data 184 and the forwarding tables of nodes coupled to the node 73, the SAC logic 163 determines which of the data flows are received by which of the ingress ports 81-83. Further, for a given data flow, the SAC logic 163 determines the rate at which the data flow is received by the node 73 based on the set of service performance data 188 that is indicative of the data flow. In addition, the node data 181 indicates which of the ingress ports 81-83 feed which of the ingress queues 128. Using the foregoing knowledge, the SAC logic 163 aggregates the rates of data flows feeding a given ingress queue 128 in order to calculate the rate, referred to as the "ingress rate," at which the queue 128 receives data.

The node data 181 indicates the average rate, referred to as "average service rate," at which the forwarding logic 128 pulls data from the ingress queue or, in other words, services the ingress queue 128. Such service rate may vary from node-to-node and/or queue-to-queue depending on the configuration of the respective node. For each ingress queue 128, the SAC logic 163 compares the queue's average service rate to the queue's ingress rate calculated by the SAC logic 163. If the ingress rate exceeds the average service rate, then it is likely that data overruns will occur when each data flow serviced by the queue 128 is simultaneously active and transmitting according to its performance parameter limits. In such case, the SAC logic 163 determines that the node's configuration does not adequately support the data flows passing through the node 73 and, thus, detects a potential violation of the performance parameters indicated by the service performance data 188 or, in other words, predicts a violation of such performance parameters.

In addition to checking the ingress rate for each ingress queue 128 to ensure that it does not exceed the queue's average service rate, the SAC logic 163 also checks the burst parameters specified for the data flows passing through the queue 128 to ensure that the queue's depth is sufficient for supporting the data flows. For example, in one exemplary embodiment, the service performance data 188 indicates a maximum burst size for each data flow. The maximum burst size pertains to the amount of data that is allowed over a given time period for the data flow. If the amount of data from a data flow for the given time period exceeds the maximum burst size specified for the data flow, then data from the data flow may be dropped by a policer 126 or other component such that the actual burst size affecting the queues 128 is limited to the maximum burst size specified for the data flow. Such dropping of data does not violate the parameters specified by the service performance data 188 and helps to prevent or mitigate congestion in the network by preventing a data flow from usurping more network bandwidth than is allowed according the service performance data 188.

For each ingress queue 128, the SAC logic 163 aggregates the maximum burst sizes specified for each data flow serviced by the ingress queue 128 and compares the aggregated burst size to a value indicative of the queue's depth to determine whether the queue 128 is of sufficient size to handle bursting by all of the data flows at the same time without violating any of the performance parameters specified by the service performance data 188. As an example, the node data 181 may indicate the queue's depth, and the SAC logic 163 may determine that the queue 128 is not sufficiently large if the aggregated burst size exceeds the value indicative of the queue depth. In such case, the SAC logic 163 determines that the node's configuration does not adequately support the data flows passing through the node 73 and, thus, detects a potential violation of the performance parameter limits indicated by the service performance data 188.

Further, based on the forwarding table 111 of the node 73, the SAC logic 163 determines which of the egress queues 133 receives each data flow passing through the node 73. Once the SAC logic 163 identifies which data flows feed a given egress queue 133, the SAC logic 163 calculates an ingress rate for the queue 133 similar to the techniques described above for calculating the ingress rates for the queues 128. That is, the SAC logic 163 aggregates the rates of data flows feeding the egress queue 133 such that the calculated ingress rate represents the rate at which the egress queue 133 receives data when all of the data flows are active and transmitting at the minimum transmission rates respectively specified for the flows by the service performance data 188.

The node data 181 indicates, for each egress queue 133, the average service rate at which data is pulled from the queue 133. In this regard, the average service rate for an egress queue 133 may be limited by the maximum link rate for the link that connects the queue's egress port 84-86 to another node of the network 52. The average service rate is also based on the number of other egress queues 133 that feed the same egress port 84-86 and the respective service rates of such other egress queues 133. As an example, to help prevent data overruns in the egress queues 133, it is generally desirable for the aggregate of the average service rates of the queues 133 feeding the same egress port 84-86 to not exceed the maximum link rate for the link that is coupled to such egress port 84-86.

For each egress queue 133, the SAC logic 163 compares the queue's average service rate to the queue's ingress rate calculated by the SAC logic 163. If the ingress rate exceeds the average service rate, then it is likely that data overruns will occur when each data flow serviced by the queue 133 is simultaneously active and transmitting according to its performance parameter limits. In such case, the SAC logic 163 determines that the node's configuration does not adequately support the data flows passing through the node 73 and, thus, detects a potential violation of the performance parameter limits indicated by the service performance data 188.

In addition to checking the ingress rate for each egress queue 133 to ensure that it does not exceed the queue's average service rate, the SAC logic 163 also checks the burst parameters specified for the data flows passing through the queue 133 to ensure that the queue's depth is sufficient for supporting the data flows. For example, as described above, the service performance data 188 may indicate a maximum burst size for each data flow.

For each egress queue 133, the SAC logic 163 aggregates the maximum burst sizes specified for each data flow serviced by the egress queue 133 and compares the aggregated burst size to a value indicative of the queue's depth to determine whether the queue 133 is of sufficient size to handle bursting by all of the data flows at the same time without violating any of the performance parameters specified by the service performance data 188. As an example, the node data 181 may indicate the queue's depth, and the SAC logic 163 may determine that the queue 133 is not sufficiently large if the aggregated burst size exceeds the value indicative of the queue depth. In such case, the SAC logic 163 determines that the node's configuration does not adequately support the data flows passing through the node 73 and, thus, detects a potential violation of the performance parameter limits indicated by the service performance data 188.

It should be noted that there are many other performance parameters that may be analyzed to determine whether the network segment 153 is sufficiently configured to support the data flows serviced by it. If the SAC logic 163 does detect a potential violation of the performance parameters specified by the service performance data 188, then the SAC logic 163 reports such potential violation to a user. As an example, the SAC logic 163 may display a message regarding the potential violation via the output interface 175 (FIG. 4). Alternatively, the SAC logic 163 may transmit a message via the network interface 177 or otherwise to a remote device (not specifically shown) that displays the message to a user. Other techniques for reporting a potential violation are possible in other embodiments.

In addition, the message for reporting the potential violation may include information indicative of the cause of the violation possibility. For example, if the SAC logic 163 detected a potential violation due to a queue having insufficient depth to accommodate the bursting of data flows passing through it, then the message may identify the node and/or queue having the insufficient queue depth. The message may also indicate the type of problem that caused the potential violation, such as insufficient queue depth in the instant example. Based on the message, the user may then take steps to alleviate the problem, such as modifying the configuration of or replacing the node or queue responsible for the potential violation.

By knowing the source of the potential violation, the user may be able to alleviate the problem more efficiently than would otherwise be possible. For example, as described above in the Related Art, when network problems occur, some network service providers might add more capacity, such as more nodes, in an attempt to address the problems. However, without actually diagnosing the source of the problem, there is no guarantee that such attempts will actually address the network problem. Further, it may take several attempts of adding different types of network components before the network problem is actually alleviated thereby increasing the cost of servicing the network. In addition, even if the attempts to add capacity do ultimately address the network problem, the capacity additions may be more costly than the steps that can be used to address the problem if the network service provider knows which portion of the network 52 is the source of the problem. For example, rather than adding more nodes, a network service provider might expand the queue depths of a particular node at a much smaller overall cost. In addition, the notification provided by the SAC logic 163 may provide notice of a potential service problem before the problem actually degrades a service below the performance minimums specified by the service performance data 188. Thus, the notifications provided by the SAC logic 163 helps a service provider to ensure compliance of SLAs requirements thereby increasing customer satisfaction with the network services.

In one exemplary embodiment, before a network service provider adds a service to the network 52, the network service provider preferably notifies the SAC element 150 of the service so that the SAC element 150 can check for performance compliance issues before the service is actually added. In this regard, a user, such as a technician of the network service provider, downloads or otherwise provides the SAC element 150 a set or sets of service performance data 188 indicative of the contemplated data flow or flows for the new service. The SAC logic 163 then analyzes the data indicative of the configuration and performance of the network segment 153, such as the service performance data 188, the topology data 184, and the node data 181, as described above, to determine whether the addition of the service results in any potential violations of the service performance data 188. That is, the SAC logic 163 determines whether there are any potential violations of the parameters specified by the service performance data 188 for any of the nodes of the network segment 153 assuming that each data flow supported by the segment 153, including the new data flow or flows for the new service, may be simultaneously active and transmitting at the average rates and maximum burst size specified by the service performance data 188.

If there are no potential violations detected, the SAC logic 163 preferably transmits and/or displays a message indicating that the new service is deemed admissible. In response, the new service may be added knowing that the configuration of the network segment 153 is sufficient for servicing all of the data flows, including the new flow or flows being added.

If the SAC logic 163 does detect a potential violation, then the SAC logic 163 preferably transmits and/or displays a message indicating that the new service is deemed inadmissible. In such case, the user is aware that the configuration of the network segment 153 is insufficient for supporting all of the data flows under certain conditions if the new service is added. Accordingly, the user may refrain from adding the new service in order to prevent violations of the performance parameter limits indicated by the service performance data 188. Alternatively, the user may reconfigure or modify the network segment 153 in an attempt to change the segment 153 such that it is capable of supporting the data flows, including the new data flow or flows, without violating the performance parameters specified by the service performance data 188. Once the changes are implemented, the user can cause the SAC element 150 to repeat the process of checking for violations of the performance parameters indicated by the service performance data 188 to determine whether the service is now admissible considering the network modifications.

Note that after changing the configuration of the network segment 153, a user may cause the SAC element 150 to re-discover the network topology and the node's configuration in order to update the node data 181 and the topology data 184 for recent network changes. The SAC element 150 may also from time-to-time automatically (e.g., periodically) re-discover the network topology and the node's configurations to update the node data 181 and the topology data 184 for recent network changes.

An exemplary use and operation of the system 15 will now be described below with particular reference to FIG. 5.

Figure 5:
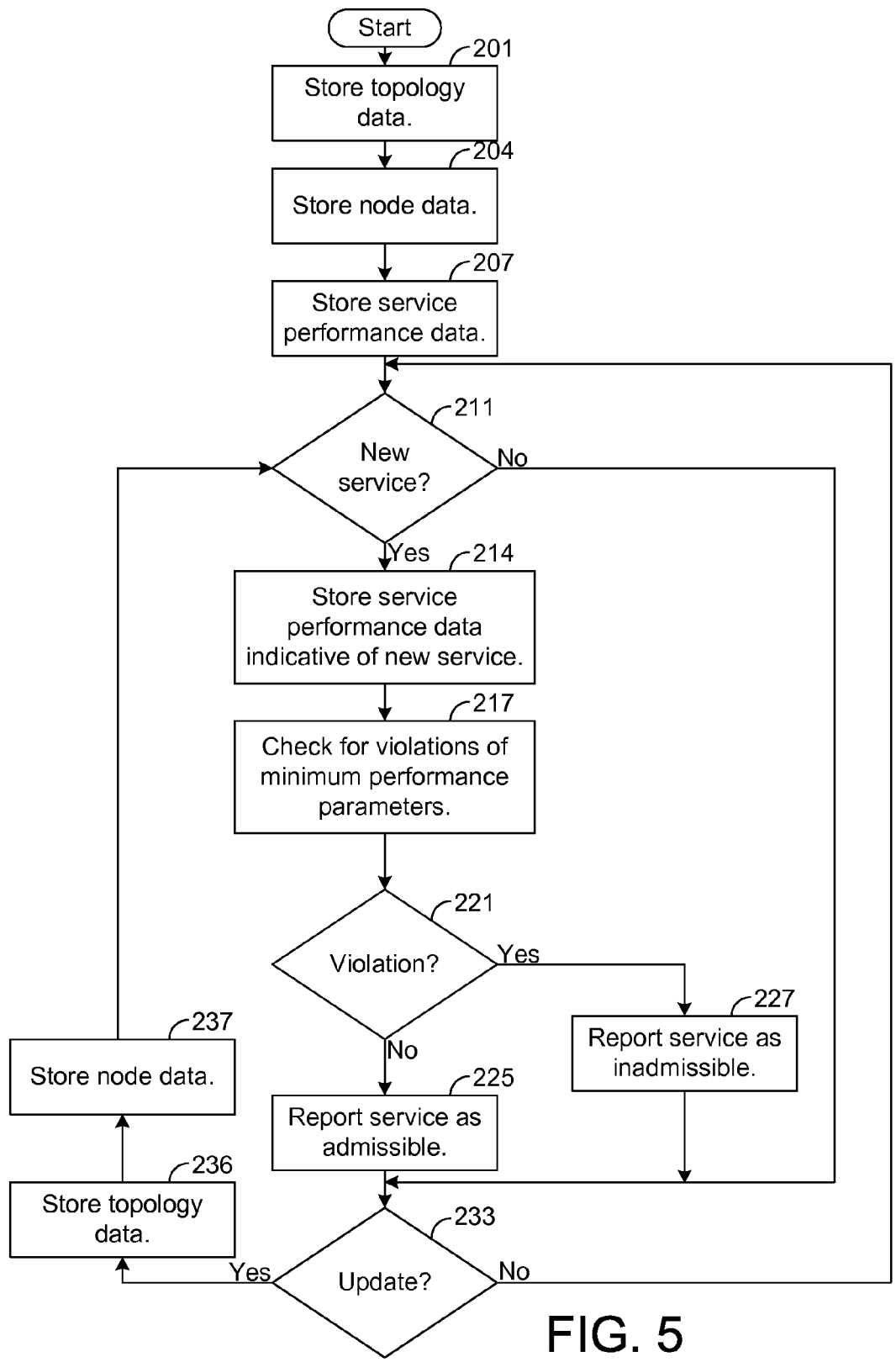
FIG. 5 is a flow chart illustrating an exemplary method for determining whether a new network service to be supported by a network segment, such as is depicted by FIG. 2, is deemed to be admissible.

Initially, the SAC logic 163 of the SAC element 150 stores topology data 184, as shown by block 201 of FIG. 5. As an example, the SAC logic 163 may transmit discovery requests via the network interface 177 through the network segment 153 to discover the presence of the nodes 61-63, 73, 74 within the network segment 153. Such techniques of network discovery are generally well-known in the art. Alternatively, the topology data 184 may be stored in the SAC element 150 via other techniques, such as input by a user via the input interface 172.

The topology data 184 identifies each node 61-63, 73, 74 of the network segment 153, and the SAC logic 163 uses the topology data 184 to discover the configuration and capacity of each node 61-63, 73, 74 of the segment 153. The SAC logic 163 stores node data 188 indicative of such configuration and capacity, as shown by block 204 of FIG. 5.

As an example, in one embodiment, the SAC logic 163 transmits a request, referred to as hereafter as "configuration request," to each node of the segment 153, and the node replies indicating its configuration and capacity. For example, assume that the node 73 shown by FIG. 3 receives a configuration request from the SAC logic 163. In response, the node logic 101 retrieves the node data 105 and transmits such data to the SAC element 150, and the SAC logic 163 stores such data as a set of the node data 181. This set of node data 181 identifies the node 73 and indicates the node's configuration and capacity. As an example, the set of node data 181 may include the forwarding table 111, queue data 112, and resource list 113 of the node 73. This set of node data 181 may be analyzed to determine which data flows pass through which queues 128, 133 and to determine the depths of the queues 128, 133. The data 181 may also indicate link rates, service rates of the queues 128, 133, and other information for assessing whether there is any potential violation of any of the performance parameters specified by the service performance data 188.

The SAC logic 163 also stores service performance data 188 for each service currently supported by the network segment 153, as shown by block 207 of FIG. 5. Such data 188 may be downloaded to the SAC element 150 by transmitting it through the network 52 or otherwise. If desired, a user may input such data 188 via the input interface 172.

Note that, in one exemplary embodiment, each service that is added to the network segment 153 is checked for violations such that there are no existing data services at the start of the process shown in FIG. 5. In such case, block 207 may be omitted.

When a new service is to be added, a set of service performance data 188 indicative of the new service is stored in the SAC element 150, as shown by blocks 211 and 214 of FIG. 5. The SAC logic 163 then checks for any potential violations of the performance parameters indicated by the service performance data 188, as shown by block 217 of FIG. 5. In this regard, the SAC logic 163 analyzes each set of node data 181 to ensure that each node of the network segment 153 is sufficiently configured to process the data flows feeding it without violating the specified performance parameters. For example, in one exemplary embodiment, for each node, the SAC logic 163 identifies each queue within the node and determines whether each queue has sufficient capacity to service the data flows feeding it.

As a mere example, during the performance of block 217, the SAC logic 163 retrieves the set of node data 181 indicative of the exemplary node 73 shown by FIG. 3. Such data identifies each queue 128, 133 of the node 73, and the SAC logic 163 analyzes each queue 128, 133 to ensure that it has sufficient capacity to handle the data flows that feed it. For example, in analyzing an egress queue 133, the SAC logic 163 determines a list of data flows that feed the egress queue 133 based on the forwarding table 111 indicated by the node data 181. The SAC logic 163 also determines the rate that each data flow feeds the queue 133 assuming that each data flow is transmitting at the minimum transmission rate specified for it by the service performance data 188. The SAC logic 163 also aggregates the ingress rates of the flows feeding the queue 133 and compares the aggregated ingress rate to the queue's service rate, as indicated by the node data 181. If the service rate is less than the aggregated ingress rate, then a data overrun is possible such that at least one flow may be unable to maintain at least one performance parameter, such as transmission rate, specified by the service performance data under some circumstances, such as when all of the data flows feeding the queue 133 are active. In such case, the SAC logic 163 detects a potential violation of the performance parameters specified by the service performance data 188.

The SAC logic 163 also aggregates the burst size specified for each data flow that feeds the egress queue 133 and determines whether the aggregated burst size exceeds the depth of the queue 133. If so, the SAC logic 163 detects a potential violation of the performance parameters specified by the service performance data 188. The SAC logic 163 may also perform other checks for determining whether any parameter of the service performance data 188 is potentially violated.

If a potential violation is not detected after checking the configuration and capacity of each node of the network segment 153, then the SAC logic 163 renders a message indicating that the new service is admissible, as shown by blocks 221 and 225 of FIG. 5. However, if a potential violation is detected, then the SAC logic 163 renders a message indicating that the new service is inadmissible, as shown by blocks 221 and 227 of FIG. 5. By only adding services to the network segment 153 deemed to be admissible, the network service provider can ensure that the network segment 153 is adequately configured to handle all data flows without violating the performance parameters specified by the service performance data 188. Thus, the network service provider can ensure SLA compliance.

In addition, if the new service is deemed inadmissible, the SAC logic 163 may display a message indicative of the reason for such inadmissibility. As an example, as described above, if the new service is inadmissible due to insufficient queue capacity in a particular node, the message may indicate that this node has insufficient queue capacity for the new service. Such message may include the node identifier of such node so that a user can determine which node is the source of the problem. Also, the message may indicate which performance parameter or parameters were deemed violated by the addition of the new service. Such information may be useful in diagnosing the source of the problem.

In one exemplary embodiment, the SAC logic 163 tests performance parameters of the new service to see if the service could be admitted if its performance requirements were relaxed. For example, the SAC logic 163 may retest the new service for admissibility after changing (e.g., reducing) its minimum data rate or other performance parameter. If the SAC logic 163 determines that the service would be admissible if the service's minimum data rate is reduced to a particular value or if some other performance parameter is changed, then the message may indicate as such. Further, the SAC logic 163 may do the same with other existing services to see if there is a way of adjusting the required performance parameters of existing services to make the new service admissible. Moreover, the SAC logic 163 may provide suggestions on how to modify the network or the services supported by the network in order to make the new service admissible.

As shown by block 233, the SAC logic 163 may determine from time-to-time to update the topology data 184 and the node data 181. Such determination may be based on user input, such as upon request, or may occur automatically. When an update is to be performed, the SAC logic 163 repeats discovery of the topology and node configuration such that new topology data 184 and node data 181 are stored in the SAC element 150, as shown by blocks 236 and 237.

Now, therefore, the following is claimed:

1. A communication system, comprising:
 a packet network having a plurality of nodes; and
 a control element configured to store topology data, service performance data, and node data, wherein the topology data is indicative of a topology of the packet network, wherein the node data is indicative of a configuration of the nodes of the packet network and includes a plurality of queue values, wherein each of the queue values indicates a queue capacity for a respective one of the nodes, wherein the control element is configured to communicate with each of the nodes to automatically discover the node data, and wherein the service performance data is indicative of performance parameter limits for data flows of a plurality of data services supported by the packet network, the control element configured to determine, based on the topology data, the node data, and the service performance data, whether the configuration of the nodes is sufficient for enabling each of the data flows to simultaneously operate at the performance parameter limits indicated by the service performance data, wherein the control element is configured to provide an indication based on whether the configuration of the nodes is determined to be sufficient for enabling each of the data flows to simultaneously operate at the performance parameter limits indicated by the service performance data, wherein the control element is configured to determine based on the node data and the topology data which of the data flows have data paths that pass through a component of one of the nodes, and wherein the control element is configured to determine, based on at least one of the queue values, whether the component has sufficient capacity for handling each of the data flows having a data path passing through the component assuming that each of the data flows having a data path passing through the component is operating according to at least one performance parameter limit indicated by the service performance data for the respective data flow.

2. The system of claim 1, wherein the control element is configured to predict a violation of the performance parameter limits indicated by the service performance data based on the queue values.

3. The system of claim 1, wherein the control element is configured to automatically discover the topology of the packet network.

4. The system of claim 1, wherein the component comprises a queue, and wherein the control element is configured to determine whether the queue has sufficient queue depth to ensure that the queue does not cause a violation of the performance parameter limits indicated by the service performance data.

5. The system of claim 1, wherein the component comprises a queue, and wherein the control element is configured to calculate an ingress rate for the queue based on the topology data, the node data, and the service performance data, wherein the control element is configured to perform a comparison between the ingress rate and a service rate for the queue, and wherein the indication is based on the comparison.

6. A control element, comprising:
 memory for storing a plurality of sets of node data, a plurality of sets of service performance data, and topology data, wherein each of the sets of the node data is correlated with a respective one of a plurality of nodes of a packet network and indicative of a configuration of the correlated node, wherein the sets of node data include a plurality of queue values, wherein each of the queue values indicates a queue capacity for a respective one of the nodes, and wherein the sets of the service performance data are respectively correlated with data flows of a plurality of data services supported by the packet network and specify performance parameter limits for the correlated data flows, and wherein the topology data is indicative of a topology of the packet network; and
 logic to calculate, based on the topology data, the node data, and the service performance data, at least one performance parameter for the packet network under a condition when each of the data flows is simultaneously operating according to the performance parameter limits specified by the correlated set of performance parameter data, the logic configured to communicate with each of the nodes to automatically discover the node data, the logic further configured to indicate whether the packet network is sufficiently configured to ensure compliance with the performance parameter limits specified by the sets of service performance data based on the calculated performance parameter for the packet network, wherein the logic is configured to determine based on the node data and the topology data which of the data flows have data paths that pass through a component of one of the nodes, and wherein the logic is further configured to determine, based on at least one of the queue values, whether the component has sufficient capacity for handling each of the data flows having a data path passing through the component during the condition.

7. The element of claim 6, wherein the logic is configured to predict a violation of the performance parameter limits specified by the sets of service performance data based on the queue values.

8. The element of claim 6, wherein the logic is configured to automatically discover the topology of the packet network.

9. The element of claim 6, wherein the component comprises a queue, and wherein the logic is configured to determine whether the queue has sufficient queue depth to ensure that the queue does not cause a violation of performance parameter limits specified by the sets of service performance data.

10. The element of claim 6, wherein the component comprises a queue, and wherein at least one performance parameter includes an ingress rate for the queue.

11. The element of claim 10, wherein the logic is configured to perform a comparison between the ingress rate and a service rate for the queue, and wherein the logic is configured to indicate whether the packet network is sufficiently configured to ensure compliance with the performance parameter limits specified by the sets of service performance data based on the comparison.

12. A system for guaranteeing service level agreement (SLA) requirements for a packet network, comprising:
    memory; and
    logic configured to receive service performance data indicative of performance parameter limits for data flows of data services supported by the packet network, the logic configured to receive node data from the nodes, the node data indicative of configurations of the nodes and including at least a plurality of queue values, each of the queue values indicative of a queue capacity for a respective one of the nodes, the logic further configured to analyze the node data and to predict a violation of at least one of the service performance limits based on an analysis of the configurations, wherein the analysis is based on the queue values, wherein the logic is configured to determine based on the node data and the topology data which of the data flows have data paths that pass through a queue of one of the nodes, and wherein the logic is configured to determine, based on at least one of the queue values, whether the queue has sufficient capacity for queuing data packets from each of the data flows having a data path passing through the queue if each of the data flows having a data path passing through the queue is simultaneously operating at a respective performance parameter limit indicated by the service performance data.

13. A method, comprising the steps of:
    storing in memory topology data, service performance data, and node data, wherein the topology data is indicative of a topology of a packet network, wherein the service performance data is indicative of a configuration of a plurality of nodes of the packet network, wherein the node data includes a plurality of queue values, wherein each of the queue values indicates a queue capacity for a respective one of the nodes, and wherein the service performance data is indicative of performance parameter limits for data flows of a plurality of data services supported by the packet network;
    communicating with the nodes;
    automatically discovering the node data based on the communicating step;
    determining, based on the topology data, the queue values, and the service performance data, whether the configuration of the nodes is sufficient for enabling each of the data flows to simultaneously operate at the performance parameter limits specified for the data flows by the service performance data; and
    providing an indication based on the determining step, wherein the determining step comprises the steps of:
        determining based on the node data and the topology data which of the data flows have data paths that pass through a component of one of the nodes; and
        determining based on at least one of the queue values whether the component has sufficient capacity for handling each of the data flows having a data path passing through the component under a condition when each of the data flows having a data path passing through the component is operating according to at least one performance parameter limit specified by the service parameter data for the respective data flow.

14. The method of claim 13, further comprising the step of automatically discovering the topology of the packet network.

15. The method of claim 13, wherein the component comprises a queue, and wherein the step of determining whether the component has sufficient capacity further comprises the step of determining whether the queue has sufficient queue depth to ensure that the queue does not cause a violation of the performance parameter limits during the condition.

16. The method of claim 13, wherein the component comprises a queue, and wherein the step of determining whether the component has sufficient capacity further comprises the steps of:
    calculating an ingress rate for the queue based on the topology data, the node data, and the service performance data; and
    comparing the ingress rate and a service rate for the queue.

17. The method of claim 13, wherein the step of determining, based on the topology data, the node data, and the service performance data, whether the configuration of the nodes is sufficient for enabling each of the data flows to simultaneously operate at the performance parameter limits is performed prior to operation of at least one of the data flows having a data path passing through the component.

* * * * *